United States Patent Office 2,786,032
Patented Mar. 19, 1957

2,786,032

MODIFIED COPOLYMERS AND PREPARATION AND USES THEREOF

William C. Hollyday, Jr., Fanwood, and Marvin H. Mahan, Roselle, N. J., assignors to Esso Research and Engineering Company, a corporation of Delaware No Drawing. Application November 9, 1953, Serial No. 391,127

3 Claims. (Cl. 252—59)

This invention relates to novel modified copolymer products and to methods of preparing and using same, and more particularly it relates to making and using novel alkylated derivatives of high molecular weight copolymers of styrene or other polymerizable monomer containing an aromatic nucleus, of which a styrene- isobutylene copolymer of certain characteristics, as will be explained more fully hereinafter, is one example. A purpose of this invention is to use these novel products in lubricating oil and other oils in such concentrations as to lower the pour-points of said oils.

This application is a continuation-in-part of Serial No. 79,872, filed March 5, 1949, now Patent 2,658,872.

Copolymers of styrene and isobutylene, and more generally copolymers of aliphatic olefins with polymerizable cyclic compounds, are disclosed in U. S. Patent 2,274,749. The general method of preparing such copolymers is also disclosed therein and consists essentially in carrying out the copolymerization of the mixed reactants at a temperature below 0° C., such as −10° C., −50° C., −80° C., −100° C., or even lower, in the presence of an active halide polymerization catalyst, and preferably in the presence of an inert, volatile organic liquid serving as solvent and refrigerant.

Instead of styrene, other polymerizable cyclic material may be used, such as alphamethyl styrene, paramethyl styrene, alphamethyl paramethyl styrene, indene, terpene, coumarone, dihydronaphthalene, etc., as well as copolymers of indene and coumarone.

Instead of isobutylene, other isoolefins may be used such as isoamylene, particularly methyl-2 butene-2, isooctylene, etc., as well as other aliphatic olefins such as propylene, normal butylene, etc.

For the purposes of the present invention, it is preferred to use the copolymers of relatively higher molecular weight such as are prepared by carrying out the copolymerization at a temperature below −50° C., and preferably using as polymerization catalyst aluminum chloride or other Friedel Craft catalyst already dissolved in a suitable solvent such as methyl chloride or ethyl chloride. The combination of the use of a dissolved catalyst and the very low temperature results in the formation of a copolymer of highest molecular weight, and consequently one which will have best viscosity index improving properties.

As disclosed in said original application, the proportions in which the styrene or other polymerizable cyclic material and the isobutylene or other alkene may be copolymerized, for alkylation to make pour depressors, may vary over a wide range of about 10 to 90% by weight. Styrene-isobutylene copolymers having a low range of styrene content, e. g. 15–40%, are soluble in aliphatic solvents, including mineral lubricating oils, even of fairly high V. I. (viscosity index), e. g. 30–100 or 115. Alkylation of such copolymers is claimed in said parent application.

However, the commercial manufacture of such copolymers of 15–40% stryene content is difficult because these polymers are somewhat tacky thermoplastic solids which are inconvenient to handle.

On the other hand, copolymers of higher styrene content, e. g. 50–90%, are harder, substantially non-tacky solids better adapted to commercial manufacture, but they are less soluble, or insoluble, in aliphatic type lubricating oils. The present application claims alkylation of this less soluble but commercially available high-styrene type of copolymer with certain long chain olefins, as will be explained below.

For convenience and brevity, a copolymer made from styrene and isobutylene will be referred to for brevity as stybutene. The invention will be illustrated as applied particularly to stybutene, although it is not to be limited thereto.

The present invention comprises broadly the alkylation of these above-described copolymers which contain a reactive aromatic nucleus, by reacting them with long-chain olefins at or near room temperature or somewhat lower temperature, in the presence of an alkylation catalyst, to produce oil-soluble products useful not only as V. I. improvers, but also as pour depressors in lubricating oils.

The long-chain olefins to be used should have at least 16 carbon atoms, or those in the range of 16 to 22 carbon atoms, preferably about 18 to 20 carbon atoms, as for instance octadecene, as well as either pure or mixed olefins derived by dehydrogenation, alone or with cracking, of paraffin wax, or other solid or liquid petroleum hydrocarbon fractions, or olefins formed by polymerization of lighter olefins such as those having from 2 to 8 or 10 carbon atoms, particularly propylene and isobutylene, or other synthetic olefins such as those produced in the Fischer synthesis process, provided they contain a major proportion of $C_{18-20}$ olefins.

It should be noted that the products of the present invention are different from products obtained by simultaneous polymerization condensation of three reactants such as styrene, isobutylene, and cracked wax olefins, because in such a case, a substantial amount of the higher olefins enter into the formation of a linear chain or three-dimensional chain, in addition to mere alkylation of some of the aromatic nuclei present, whereas in the present process, a linear high molecular weight copolymer is first formed with only the styrene and lower alkene, and then only are the higher olefins added for the alkylation step.

The proportions to be used of the high molecular weight copolymer and the long-chain olefin used to alkylate it, may vary over a considerable range, but generally should be about 0.2 to 2.0, preferably about 0.5 to 1.0, parts by weight of the long-chain olefin for each one part by weight of the high molecular weight copolymer. On a molar basis, ¾ to 1¼ mole, preferably 1 mole, of olefin should be used per phenyl or other aromatic group in the copolymer.

The temperature used for carrying out this alkylation reaction is critical in that if it is either too high or too low, active pour depressors, as desired in this invention, will not be obtained, even though products made at the higher and lower temperatures may be useful for some other purposes such as for improving the viscosity index of lubricating oils, or as modified resins or plastics. The alkylation temperature to be used according to the present invention should generally be between −50° C. and +40° C., and the best results are obtained in the preferred range of −20° C. to +25° C. Thus, the alkylation reaction can be carried out at ordinary room temperature, or at slightly reduced temperatures such as 0° C., obtained by cooling with ice, or at even slightly lower temperatures as may be readily obtained by cooling with a refrigerated salt brine, or by using liquefied methyl chloride refrigerant (which boils at −23° C., therefore maintains that temperature).

As the high molecular weight copolymer used as one of the two chief reactants is a solid, the alkylation reaction is preferably carried out in the presence of a solvent for said copolymer, but one which is inert in the alkylation reaction per se. The suitability of the solvent may vary somewhat according to the alkylation temperature used. For instance at a temperature of +25° C., orthodichlorbenzene has been found very suitable, while at temperatures in the range of from +10° C. down to −20° C., ethyl chloride is suitable, while at still lower temperatures, methyl chloride can be used. Numerous other unreactive solvents, including other halogenated hydrocarbon solvents, would also be satisfactory. However, aliphatic or paraffinic solvents such as petroleum ether, hexane, etc. are not suitable solvents for stybutenes of high styrene content as used in the present invention.

The amount of solvent should be about 1 to 10, preferably about 3 to 6, volumes of solvent per volume of mixed reactants.

The preferred alkylation catalyst is anhydrous aluminum chloride, added to the reaction mixture, either as a dry powder or in fine granular form, or preferably dissolved in a suitable solvent inert to the alkylation reaction, and preferably the same liquid as used as solvent for the reaction medium.

The alkylation reaction time will, of course, vary according to the particular temperature used and the concentration of catalyst and reactants, but normally will range from 1 to 50 hours, and preferably about 2 to 25 hours.

After the alkylation reaction has been completed, it is desirable to inactivate any remaining catalyst by adding a hydrolyzing agent such as water, or a low molecular weight alcohol, or an aqueous solution of an alcohol, or an aqueous solution of a caustic soda. Then, the alkylation reaction product may be separated from the resulting catalyst sludge, by settling, centrifuging, or other suitable means, and finally the desired reaction product, still dissolved in the solvent, may be washed with water, and either stored, shipped or used while still dissolved in the solvent, or may be recovered from the solvent solution by distillation or precipitation, as by addition of alcohol. Thus, a lower alcohol such as isopropyl alcohol, if not too much diluted with water, may serve simultaneously to hydrolyze the catalyst and precipitate the alkylated copolymer reaction product.

The product, made according to the above-described process of this invention, is a high molecular weight aromalkene copolymer having a 50 to 90%, preferably 60 to 70% by weight content of combined aromatic constituent, and having a Staudinger molecular weight of at least 2000, preferably at least 10,000, which has been alkylated with a sufficient amount of long chain olefins to impart to the copolymer pour depressing properties as judged by the ASTM Pour Point Test on a lubricating oil containing .01 to 2.0% of the alkylated copolymer dissolved therein. For purposes of the present invention, an active pour depressor may be defined as one which is capable, when added in 1% by weight concentration to a highly paraffinic lubricating oil having an ASTM pour point of +20° F., of depressing the pour point and making a blend having an ASTM pour point at least as low as −15° F.

Thus, the alkylated copolymers of this invention are especially useful as wax modifiers for lowering or depressing the pour point of waxy mineral lubricating oils such as Pennsylvania lubricating oil, Mid-Continent oil, or other highly paraffinic lubricating oil base stocks. It may also be used to lower the pour point of other petroleum hydrocarbon fractions such as a paraffinic gas oil fraction, such as is used in gun-recoil oils, hydraulic fluids, etc., as well as in mineral oil greases containing various metal soaps, e. g., calcium stearate, aluminum naphthenate, sodium stearate, lithium soaps, lead soaps, etc. It may also be used in small concentrations to modify the crystal properties of ordinary paraffin wax.

The product of this invention may also be blended in vegetable or other fatty oils, such as linseed oil, cottonseed oil, soybean oil, paints, varnishes, lacquers and other coating compositions. They may be compounded with various fillers such as clay, carbon black, zinc oxides, sulfur, barium sulfate, calcium carbonate, calcium sulfate, titanium phosphate, titanium dioxide, as well as natural rubber or various synthetic rubbers, e. g., butadiene-styrene or isobutylene-diene copolymers or butadiene-acrylonitrile synthetic rubber or polychloroprene, or other high molecular weight polymeric materials such as polybutene, unalkylated styrene-isobutylene copolymers, polystyrene, polyethylene, polyacrylic esters, and various other resins and synthetic plastic materials. If desired, these alkylated copolymers may be dissolved in a volatile solvent such as naphtha, toluene, or other solvent, for use in spray coating or other purposes.

The objects, advantages and details of the invention will be better understood from a consideration of the following experimental data.

EXAMPLE 1

A copolymer of about 60% combined styrene and 40% isobutylene was made by Friedel-Craft polymerization at a temperature of about −100° C.; it had an intrinsic viscosity of about 0.6. This copolymer (10 g.) was alkylated with 14.4 g. of octadecene (1 mole of the latter per phenyl group in the copolymer) at a temperature of 25° C., the reaction being carried out in 200 ml. of orthodichlorbenzene as solvent, and using 2 g. of solid aluminum chloride as catalyst. After a reaction time of about 20 hours, the reaction liquid was quenched by the addition of a solution of isopropyl alcohol in benzene. The solution was washed with water to remove the alcohol and residual catalyst, and then the solvent was removed by evaporation on a steam bath.

The resulting product, which may be described as octadecylated styrene-isobutylene copolymer, was tested for pour depressing properties by subjecting solutions of small concentrations thereof in a waxy lubricating oil base stock to the standard ASTM pour point test. The lubricating oil base stock used had an ASTM pour point of +20° F., and was a mixture of a Mid-Continent neutral oil having a viscosity of about 150 SUS at 100° F., to which had been added 3.5% of a Pennsylvania bright stock. The data obtained were as follows:

*Table 1*

| Conc., percent: | ASTM pour point °F. |
| --- | --- |
| 0 | +20 |
| 0.25 | −20 |
| 0.50 | −30 |
| 1.00 | −30 |

It is apparent from the above data that the octadecylated styrene-isobutylene copolymer made by carrying out the alkylation reaction at 25° C., is a very effective pour depressor in waxy mineral lubricating oils. That this good result is surprising is emphasized by the fact that a similar alkylated copolymer made by carrying out the alkylation reaction at a substantially higher reaction temperature, namely 50° C., had substantially no pour depressing properties; when tested in the same lubricating oil base stock in the same concentrations of 0.25, 0.50, and 1.00%, the ASTM pour points obtained were +20, +20 and +15° F., respectively. Apparently, the higher alkylation reaction temperature permits undesired side reactions such as isomerization to supersede or counteract the desired simpler alkylation reaction which takes place at 25° C.

EXAMPLE 2

The products of this invention made by alkylating high molecular weight styrene-isobutylene copolymers of high styrene content, e. g. 60%, with a long chain olefin, of about 16 to 22 carbon atoms, e. g. octadecene, are interesting and commercially valuable because they are not only pour depressors but also viscosity index improvers. This is remarkable from the viewpoint that unalkylated copolymers of such high styrene content are not sufficiently soluble in paraffinic lubricating oils to permit their use as viscosity index improvers in automobile crankcase oils. Data on both the pour depressing properties and viscosity index improving properties are shown below from a product made according to this invention by alkylating 12.5 grams of a high molecular weight styrene-isobutylene copolymer having a styrene content of about 60% with 16 g. of normal hexadecene (1 mole of the olefin per phenyl group in the copolymer) at 0° C. in the presence of 150 ml. of methylene dichloride as solvent, and using as catalyst, 0.5 grams of solid aluminum chloride. The catalyst was added over a period of about 1 hour, and the reaction was permitted to continue an additional 2 hours, after which the reaction liquid was quenched by pouring it into a larger volume of isopropyl alcohol. After washing and recovery of the product, which was hexadecylated styrene-isobutylene copolymer, it was found to have an average Staudinger molecular weight of about 16,700.

The pour depressing properties of this product were determined by testing the ASTM pour point of a Mid-Continent lubricating oil base stock having a pour point of +15° F., and having a viscosity range of SAE 30, to which the additive was incorporated in small concentrations, as indicated below:

Table 2

| Conc., percent: | ASTM pour point °F. |
|---|---|
| 0 | +15 |
| 0.02 | +10 |
| 0.10 | −20 |

The above Table 2 shows that the styrene-isobutylene copolymer of high molecular weight and 60% styrene content, alkylated with normal hexadecene at 0° C. was a very effective pour depressor because even in the very minute concentration of 0.02% it began to lower the pour point of the lube oil base stock, and in the still small concentration of 0.10% it reduced the pour point of the oil from +15 to −20° F.

This same hexadecylated styrene-isobutylene copolymer was tested for viscosity index improving properties by determining the viscosity at 100° F. and 210° F., and the viscosity index, of blends of this product in concentrations ranging up to 3.6% in a lubricating oil base stock which consisted of a mixture of 95% of a Mid-Continent lubricating oil and 5% of bright stock, the mixed base stock having a viscosity corresponding to about SAE 10 to 20. The viscosity and V. I. data obtained on these blends is shown in the following Table 3.

Table 3

| Conc., Percent | Viscosity (SUS) at 100° F. | Viscosity (SUS) at 210° F. | V. I. |
|---|---|---|---|
| 0 | 172.6 | 45.6 | 113.0 |
| 1.2 | 250.7 | 53.9 | 129.6 |
| 2.4 | 341.9 | 64.9 | 133.1 |
| 3.6 | 455.1 | 78.1 | 138.4 |

The data in the above Table 3 show that the hexadecylated styrene-isobutylene copolymer, when added to the lubricating oil base stock in concentrations of 1.2, 2.4, and 3.6% raised the viscosity index of the base stock from 113 to 129.6, 133.1, and 138.4, respectively. This is a surprising improvement in viscosity index for a material which also was good pour depressing properties.

Products having viscosity index improving properties and satisfactory solubility in lubricating oils, can also be made by alkylating styrene-isobutylene copolymers of high molecular weight and high styrene content, e. g. 60% styrene, with olefins of medium and even short-chain length, as shown in Table 4 below, but the difficulty with these products is that if made with olefins of less than 16 carbon atoms, e. g. 10 or 8, etc., the products will not be pour depressors. In the table below are shown viscosity index data on blends in two different lubricating oil base stocks, of three different alkylated styrene-isobutylene copolymers of 60% styrene and high molecular weight, each being alkylated at about the same reaction temperature, about 0° C. and using about 1 mole of the olefin per phenyl group in the copolymer, but the three olefins being different, namely, hexadecene, and decene, and diisobutylene. Blends were made up in various concentrations as required to make in each case a blend having a desired standard viscosity, namely, 77 SUS at 210 for the heavier oil and base stock which had 56.3 SUS at 210 and had a V. I. of 92, or in the case of the lighter oil, the blend was made up to a viscosity of 70 SUS at 210 using the lighter base stock which had a viscosity of 46 SUS at 210 and had a V. I. of 112. Then the viscosity indexes of these various blends were determined, and are tabulated herebelow.

Table 4

| Basestock | A | B |
|---|---|---|
| SUS/210° F. | 56.3 | 46 |
| V. I. | 92 | 112 |
| SUS/210° F. of Blends | 77 | 70 |

| Polymer | Average Alkyl Side Chain Length (No. of Carbons) | V. I. of Blends | |
|---|---|---|---|
| Hexdecyl S-60 | 16 | 113 | 137 |
| Decyl S-60 | 10 | 117 | 145 |
| Diisobutyl S-60 | 8 | 111 | 137 |

The above data in Table 4 show that high molecular weight styrene-isobutylene copolymers of 60% styrene when alkylated with an olefin of 16, 10 or 8 carbon atoms, all have fairly good viscosity index improving properties. However, only such copolymers alkylated with a $C_{16}$ or higher olefin gives a product having pour depressing properties.

The pour point depressants made in accordance with this invention may be used in conjunction with other additives in oil. Thus they may be used in oils containing antioxidants, detergents, metal deactivators, oiliness agents, rust preventives, extreme pressure agents and improvers of viscosity index. It may also be advantageous to use them with other pour point depressants as adjuvants to prolong their effectiveness during long periods of storage at fluctuating temperatures.

What is claimed is:

1. Hydrocarbon composition comprising a major proportion of a mineral lubricating oil and an oil-soluble pour depressant and viscosity index improver prepared from an oil-insoluble copolymer of styrene being present in amounts of about 50–90% by weight, and about 10–50% of isobutylene, said copolymer having an average Staudinger molecular weight of at least 2,000, by alkylating said copolymer with a $C_{18}$ to $C_{20}$ long chain mono-olefin at a reaction temperature of about −50° C. to about +40° C.; said $C_{18}$ to $C_{20}$ long chain mono-olefin being present in amounts sufficient to render the alkylated reaction product soluble in mineral lubricating oils; said reaction product being present in an amount sufficient to substantially depress the pour point and improve the viscosity index of the hydrocarbon composition.

2. The hydrocarbon composition of claim 1 in which the vinyl aromatic hydrocarbon consists of about 60 to 70% by weight of styrene and the iso-alkene of 3 to 5 carbon atoms consists of 30–40% by weight of isobutylene, the oil-insoluble copolymer having a molecular weight of at least 10,000, the alkylation being performed in the presence of an aluminum halide catalyst.

3. The hydrocarbon composition of claim 1 in which the lubricating oil is a waxy mineral lubricating oil, the copolymer comprises about 60–70% by weight of styrene and about 40–30% by weight of isobutylene, the $C_{18}$ to $C_{20}$ mono-olefin is octadecene and is present in an amount of about 0.5–1 part by weight thereof to 1 part by weight of the styrene-isobutylene copolymer, the copolymer has an average molecular weight of at least 10,000, the alkylation being effected in the presence of an aluminum chloride alkylation catalyst at a temperature of about −25° C. to about +25° C.; said hydrocarbon composition having a viscosity index of at least 130 and an A. S. T. M. pour point of at least as low as about −15° F.

References Cited in the file of this patent

UNITED STATES PATENTS

| | | |
|---|---|---|
| 2,658,872 | Hollyday et al. | Nov. 10, 1953 |
| 2,686,759 | Giammaria | Aug. 17, 1954 |

OTHER REFERENCES

Boundy-Boyer: "Styrene, Its Polymers, etc.," Reinhold (1952), pages 874–876, 883, 888, 889.